April 12, 1938. G. R. ANDRUS 2,113,568
FOOD DIRECTING, PRESSURE RELIEVING TOOTH ASSEMBLY
Filed Nov. 30, 1934 2 Sheets-Sheet 1
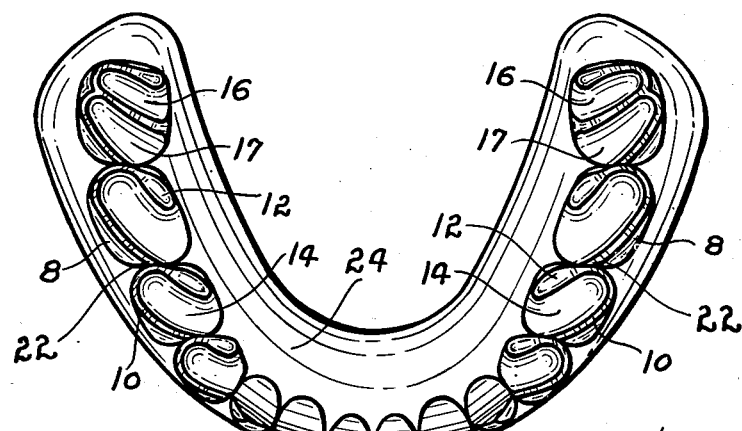
Fig-1
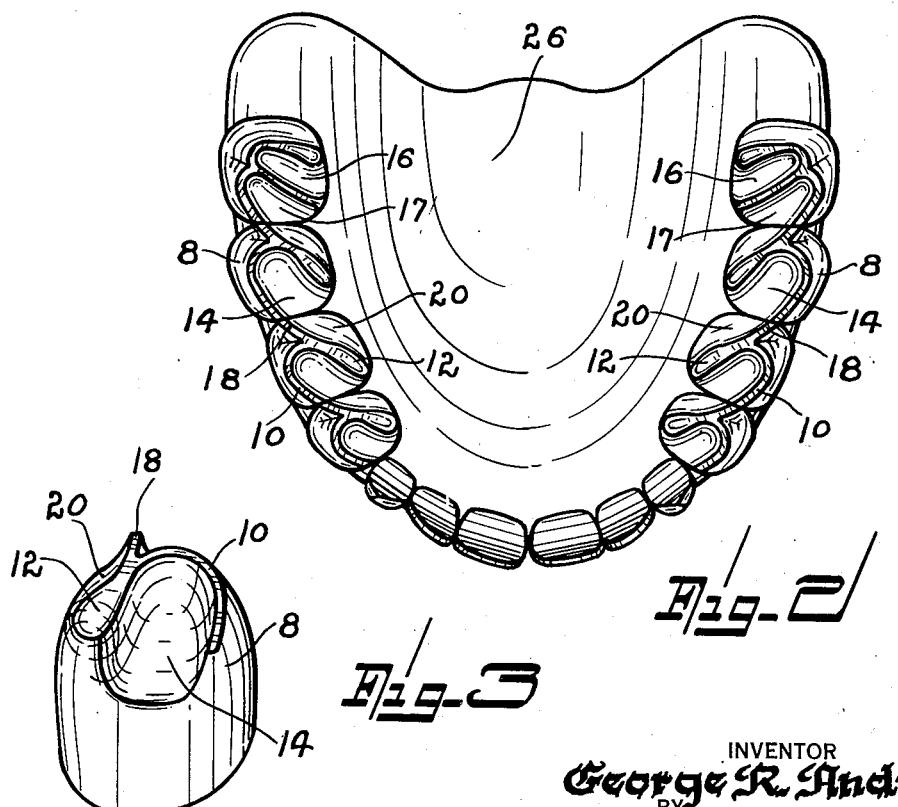
Fig-2
Fig-3
INVENTOR
George R. Andrus
BY
Smith & Tuck
ATTORNEYS April 12, 1938. G. R. ANDRUS 2,113,568
FOOD DIRECTING, PRESSURE RELIEVING TOOTH ASSEMBLY
Filed Nov. 30, 1934 2 Sheets-Sheet 2
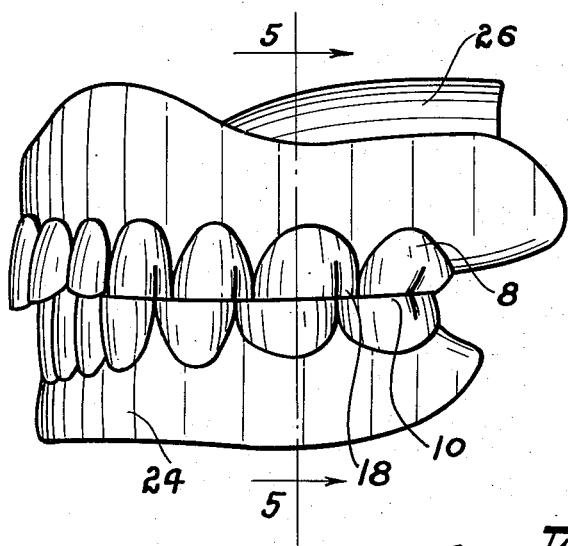
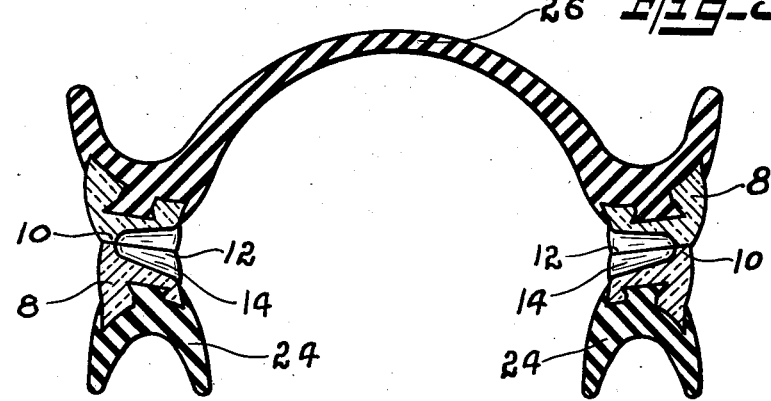
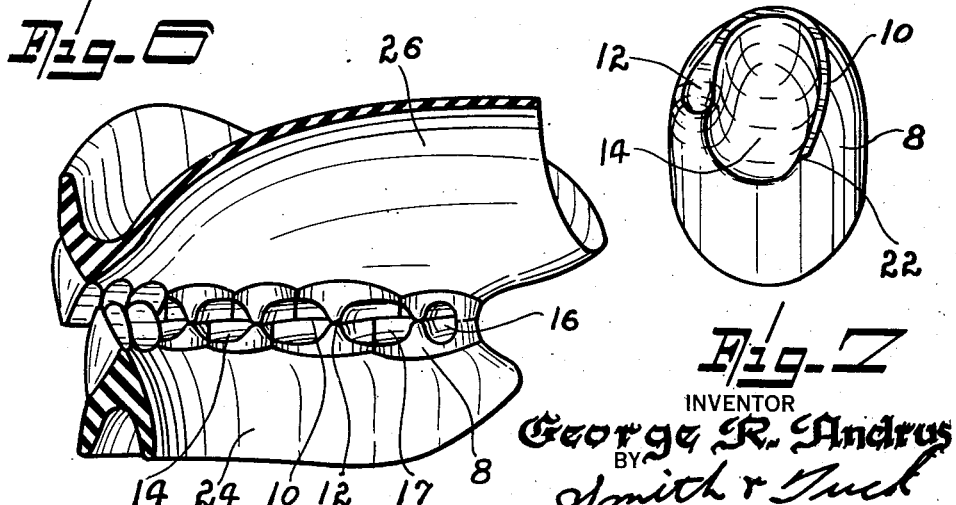
INVENTOR
George R. Andrus
BY
Smith & Tuck
ATTORNEYS Patented Apr. 12, 1938

2,113,568

UNITED STATES PATENT OFFICE 2,113,568

FOOD DIRECTING, PRESSURE RELIEVING TOOTH ASSEMBLY

George R. Andrus, Seattle, Wash.

Application November 30, 1934, Serial No. 755,480

6 Claims. (Cl. 32—8)

My present invention relates to the art of dental mechanics concerned with the production of artificial dentures and more particularly to a food directing, pressure relieving tooth assembly.

For years it has been the aim of dentists to provide an artificial denture which will truly replace nature's teeth in a patient's mouth. The task has not been an easy one inasmuch as artificial dentures must, of necessity, be less efficient than the teeth supplied by nature. There are many reasons accounting for this lack of efficiency. In the first place with nature's teeth embedded in the gums it is possible to apply tremendous pressures. Well known authorities indicate that pressures of 25 to 90 pounds is customary in the normal processes of difficult mastication and that, in tests, many people can exceed 275 pounds. Now it has been found impossible to provide a base which will adequately distribute this strain imposed upon the teeth so, as a consequence, the working pressure must be substantially reduced, as approximately 40 pounds is a maximum which artificial dentures can be safely used with, their normal pressures normally not exceeding 10 to 15 pounds. Now, it naturally follows that if the users are to successfully eat the food essential to their health some change must be made over nature's representation of teeth to make the artificial denture more efficient at the reduced allowable working pressure. It is to supply a group of teeth which will work with greater efficiency at this reduced pressure that I have provided my new tooth form. I am fully aware that many attempts have been made to produce teeth in which the biting area has been appreciably reduced so that the pressure available may be concentrated in limited areas. With such arrangements, however, there has been a marked tendency for food to collect on the teeth. This deficiency I have attempted to correct by providing tooth forms in which the applied pressure tends to clean the teeth and, further, I have provided the form of my tooth such that the tongue can very naturally and easily assist in the cleaning of the teeth. This movement of the food particles from the teeth is a very common function of the tongue in normal mastication, it is constantly although unconsciously to most persons, moving the food under the teeth and away from the grinding surfaces. Another point in which I have found it desirable to avoid nature's form of tooth is in not having a plurality of cusps which extend upwardly above the grinding surfaces. Nature provides a depression into which each cusp normally reposes. This form, however, calls for an action of the teeth that cannot be easily attained in artificial teeth. My denture provides a form which is believed to be a satisfactory solution of this problem.

Other and more specific objects will be apparent from the following description taken in connection with the accompanying drawings, wherein Figure 1 is a plan view of a lower denture.

Figure 2 is a bottom plan view of an upper denture.

Figure 3 is a perspective view of the tooth form found most suitable for use in the upper denture.

Figure 4 shows in elevation an upper and lower denture and the manner in which the teeth engage.

Figure 5 is a typical cross-sectional view as taken along line 5—5 of Figure 4.

Figure 6 is a cross-sectional view taken at right angles to Figure 5, showing the inner engagement of the teeth I employ to replace the molars and bicuspid teeth.

Figure 7 shows in perspective the form of tooth at present deemed best adapted for use in lower dentures.

Referring to the drawings, throughout which like reference characters indicate like parts, 8 designates, in general, the body of my tooth. This is provided with a ridge or rim cusp 10 and with a surface cusp 12 which is formed as a continuation of the rim except that it is expanded laterally in the biting plane to give an increased amount of biting surface. The rim cusp and the surface cusp are so arranged as to provide one or more food directing valleys or channels for each tooth.

The surfaces of the rim cusp 10 and cusp 12 are in the same plane and when used in a complete denture the planes of the cusps in the adjoining teeth normally lodge in the same plane after the showing of Figures 4, 5 and 6. This plane is not a flat plane necessarily but should conform to the general practice in denture production. The arrangement of the two set-ups should consider the natural movement of the teeth as required in mastication, excepting that in the present instance no consideration need be paid to interdigital cusp relationship.

The tooth forms shown in Figures 1 and 2 may be regarded as representative examples of sets of teeth made after the teachings of my present invention. The tooth size and general shape should conform to standard practice. It will be noted that both the upper and lower rear molars have two valleys as 16 and 17. Now, teeth made under the present plan need to conform to standard practices as far as the overbite is concerned so that the cheek will not be injured. Following out this principle it has been found desirable, if the teeth are to retain their general relationship and appearance as found in natural teeth, that the upper teeth be provided preferably with a third cusp as 18. This third cusp, as will be seen from Figure 2, is so arranged as to match up with the rim cusp 10 of the adjacent tooth. When so arranged the valley, 14, is extended on the adjacent tooth by the relieved portion, or exterior valley 20. For the lower denture, however, the rim cusp can normally extend well to the outer margin of the tooth and when so arranged the rim cusp is tapered as at 22 so that it matches up by abutting the adjacent surface cusp 12.

It will be observed it is believed that the tooth form shown presents, in mastication of food, a very much reduced biting surface, so that the corresponding pressure per unit of area can be retained as high, if not higher, than normal in natural teeth. This is a principle well known in mechanics, in that with a certain pressure available, the pressure per unit of area can be increased by decreasing the working area. The overall effect of this construction is that less pressure is placed upon the peridental membrane which, in turn, permits considerable modification of the denture bases 24 and 26. This results, particularly, in freeing and thinning of the lingual side of the lower denture from muscular attachment. This, in turn, creates a much more natural position in the mouth thereby stimulating the glands to a normal flow of saliva which, in turn, helps greatly to seal and create added suction to the suction of the dentures.

Method of operation

In making use of my principles in the making of dentures embodying teeth formed as indicated in this application, the dentist should adhere to proven practice as far as the arrangement of teeth and general form of base is concerned. He is, however, afforded a much greater latitude. This is occasioned by two outstanding conditions, the first is instead of having a plurality of intermeshing cusps as do the natural teeth, or teeth made to simulate the natural, my teeth have no cuspal interference. Further, the teeth of the upper and lower dentures meet on a plane and there is no interlocking between the teeth. The second fact is the greatly reduced pressure required to cut and masticate all types of known foods. It is a well known fact that many meats, for instance, require pressure up to 80 or 90 pounds in order to cut them as a first step in mastication. Such pressures cannot be achieved as a rule in dentures having teeth simulating the natural. It is only by greatly reducing the biting or contacting area that sufficient local pressure can be applied to give sufficient cutting, or crushing action, to chew the proper foods which mean so much in a well balanced and healthful diet. Intercuspal interference creates what is normally known as lateral interference. The cusps as they slide up and over each other tend to move the denture, bodily, sideways. This constantly applied lateral pressure to the alveolar ridge causes absorption along the sides of the process until the ridge becomes thinner. As the underlying tissues shrink away, the denture base becomes loose on the ridge which, in turn, causes many complications. This is largely avoided with my present system which produces no lateral interference.

The non-interference of cusps makes it possible for the dentures to be seated on smaller areas, and this fact, under normal conditions, permits the denture base to be trimmed or relieved of muscular attachments to a much further degree than has been attempted in the past.

The combined effect of relieving the pressure on the alveolar ridge and the non-interference of cusps makes it possible, where it is necessary, to set the teeth much further off balance than can those copied from nature, while retaining a high degree of efficiency.

This present form of tooth will, it is believed, be of particular help to dentists in constructing dentures for abnormal teeth such as the various type of flat and flabby gums; the sensitive tissue type where the dentist has to resort to roofless or semi-roofless dentures; the case of recent extraction where the gums are sore and sensitive and where the balance of the denture on the alveolar ridge must be disturbed in order to create natural expression and, finally, for cases where the supply of saliva is deficient.

The user of dentures following my principles, when chewing in a normal manner, finds that these sharply defined cusps of reduced area assist greatly in crushing and cutting the harder foods. After the food is cut the design of the teeth is such as to drive, with each closure of the dentures, the food chewed and cut by the preceding closure, down the valleys and towards the tongue, thereby greatly assisting the tongue in replacing the food in position for another closure. It is believed it will be apparent from Figures 1 and 2 that with each of the valleys pointing diagonally toward the center of the mouth and from the rearward position to the front, that the easiest possible cavity, or valley, is provided so the tongue can operate with greatest efficiency in cleaning the valleys of food.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. An artificial tooth fashioned with a generally U-shape crown-cusp forming a major groove gradually increasing in depth toward its open end at the lingual side of the tooth, said cusp also forming an exterior, open-side, lateral groove, and a single cusp extended from the rounded end of the main cusp and alined with one of the legs of the main cusp.

2. An artificial tooth fashioned with a generally U-shape crown-cusp having a flattened edge, said cusp forming a major groove with an open end at its lingual side and an open-side lateral groove, and a single cusp extended from the rounded end of the main cusp and alined with a leg thereof.

3. A pair of artificial teeth each fashioned with a generally U-shape crown-cusp forming a major groove with an open end at its lingual side for each tooth, and one of said teeth having a single cusp extended from the rounded end of the main cusp, and said single cusp alined with a leg of each of the two U-shape cusps.

4. A set of artificial teeth each of which is fashioned with a generally U-shape crown cusp forming a major groove extending diagonally of a tooth and open at its lingual side, and each of said teeth having a single cusp adapted to aline flush with a similar part of an adjoining tooth.

5. An artificial posterior tooth having on its occlusal face a contacting buccal rim cusp connecting at the distal with a shorter lingual cusp, the latter cusp being on the same plane as the former cusp but set at a disto-buccal mesio-lingual angle, said lingual cusp being substantially broadened at its mesio-lingual end to form a major cusp with smooth rounded lingual walls, said cusps forming between them a graduated groove extending from the distal junction of the cusps and terminating in an opening or mouth located at the mesial of the lingual cusp.

6. An artificial posterior tooth having on its occlusal face a buccal rim cusp and a shorter distal cusp merging therewith, and a lingual cusp merging with the junction between buccal and distal cusps, all said cusps being located on a common plane, said lingual cusp extending in a mesio-lingual direction and broadened substantially to form a smooth rounded lingual wall, and said buccal and lingual cusps forming a graduated groove having its maximum depth opening at the mesial of the broad end of the lingual cusp.

GEORGE R. ANDRUS.